United States Patent
Pan

(10) Patent No.: US 9,768,654 B2
(45) Date of Patent: Sep. 19, 2017

(54) PERMANENT MAGNET ROTOR AND MOTOR USING THE SAME

(75) Inventor: Mingpan Pan, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 0 days.

(21) Appl. No.: 12/877,124

(22) Filed: Sep. 8, 2010

(65) Prior Publication Data

US 2011/0221295 A1    Sep. 15, 2011

(30) Foreign Application Priority Data

Mar. 9, 2010 (CN) .......................... 2010 1 0125891

(51) Int. Cl.
*H02K 1/27* (2006.01)

(52) U.S. Cl.
CPC ......... *H02K 1/278* (2013.01); *H02K 2201/03* (2013.01)

(58) Field of Classification Search
CPC ..................... H02K 1/27–1/2793; H02K 1/28
USPC ..................... 310/156.06–156.18, 81, 156.45
See application file for complete search history.

(56) References Cited

U.S. PATENT DOCUMENTS

| | | | | |
|---|---|---|---|---|
| 4,217,508 A * | 8/1980 | Uzuka | ............................. | 310/46 |
| 4,322,666 A * | 3/1982 | Muller | ..................... | 318/400.41 |
| 4,417,167 A * | 11/1983 | Ishii et al. | .................. | 310/67 R |
| 4,769,567 A * | 9/1988 | Kurauchi et al. | ........ | 310/156.45 |
| 5,250,867 A * | 10/1993 | Gizaw | ........................... | 310/179 |
| 5,608,279 A * | 3/1997 | Murray | .................... | 310/156.43 |
| 5,886,440 A * | 3/1999 | Hasebe et al. | ........... | 310/156.19 |
| 6,005,319 A * | 12/1999 | Kondo | ..................... | 310/156.45 |
| 6,104,115 A * | 8/2000 | Offringa et al. | ......... | 310/156.28 |
| 6,614,140 B2 * | 9/2003 | Uemura et al. | .......... | 310/156.12 |
| 6,876,115 B2 * | 4/2005 | Takahashi et al. | ...... | 310/156.47 |
| 6,943,474 B2 * | 9/2005 | Inayama et al. | ......... | 310/156.41 |
| 6,946,766 B2 * | 9/2005 | Gary et al. | ............... | 310/156.53 |
| 7,102,263 B2 * | 9/2006 | Takano et al. | ........... | 310/156.53 |
| 7,245,054 B1 * | 7/2007 | Walls et al. | ............. | 310/156.25 |
| 7,342,338 B2 * | 3/2008 | Miyazaki et al. | ....... | 310/156.47 |
| 7,417,348 B2 * | 8/2008 | Taniguchi et al. | ....... | 310/156.53 |

(Continued)

OTHER PUBLICATIONS

J.R. Hendershot Jr., Design of Brushless Permanent-Magnet Motors, Magna Physics Publishing and Clarendon Press Oxford 1994, pp. 10, 12 and 13.*

*Primary Examiner* — Thomas Truong
(74) *Attorney, Agent, or Firm* — Matthias Scholl P.C.; Matthias Scholl

(57) ABSTRACT

A motor, including at least a stator, including at least a stator core and a coil winding, and a rotor, including at least a rotor core and multiple permanent magnets. Multiple wire receiving grooves are disposed on the stator core. The permanent magnets are disposed on the rotor core. The ratio between the number of teeth of the wire receiving grooves and that of the permanent magnets is 3:2. Every two or three of the permanent magnets form a group of permanent magnets. A gap is disposed between adjacent groups of permanent magnets. The groups of permanent magnets are circumferentially distributed. Magnetic polarities of the permanent magnet are alternatively distributed in a N phase and a S phase. Difference in an electric angle between centers of polarities of adjacent permanent magnets in one group is between 150 degrees and 170 degrees.

1 Claim, 4 Drawing Sheets

(56) References Cited

U.S. PATENT DOCUMENTS 7,453,181 B2* 11/2008 Kikuchi et al. .......... 310/156.78
2004/0251763 A1* 12/2004 Tamaki et al. ........... 310/156.53

* cited by examiner

PERMANENT MAGNET ROTOR AND MOTOR USING THE SAME

CROSS-REFERENCE TO RELATED APPLICATIONS

Pursuant to 35 U.S.C. §119 and the Paris Convention Treaty, this application claims the benefit of Chinese Patent Application No. 201010125891.5 filed on Mar. 9, 2010, the contents of which are incorporated herein by reference.

BACKGROUND OF THE INVENTION

Field of the Invention

The invention relates to a permanent magnet rotor and a motor using the same.

Description of the Related Art

With increasingly requirements of the air-conditioner technology for noise, vibration and energy conservation, requirements for motors are correspondingly increased, and thus motors driven by sine wave with small noise and vibration are used by more and more users.

To implement sine wave drive, a rotor is to generate a sine wave magnetic field. A normal measuring method is to enable the rotor to rotate whereby generating counter-electromotive force via a stator winding and detecting output a waveform in a power-off state, and a waveform of a magnetic field generated by the counter-electromotive force plays an important role in controlling sine wave. In a motor made of ferrite tiles with a weaker magnetic field, distortion of the sine wave has little effect on controlling, but in a strong magnetic field generated by sintered silicon carbidendfeb, experiments have indicated that if a waveform of the counter-electromotive force is not matched with driving sine wave generated by controlling, obvious vibration of the motor may occur.

Conventionally, there are several method of enabling the rotor to generate a sine wave magnetic field: a first one is a combination of special teeth and the pole number, for example, a stator uses ten wire receiving grooves, and a rotor uses a magnetic tile with nine poles, or the rotor uses 12 wire receiving grooves, and the rotor uses a magnetic tile with ten poles, or the rotor uses nine wire receiving grooves, and the rotor uses 8 poles. FIG. 1 illustrates a waveform of counter-electromotive force of a motor using these combinations between the special teeth and the pole number, a curve of the waveform of the counter-electromotive force of the motor is smooth, and there is no distortion point on the curve. The waveform features good effect for sine wave control. However, wire winding of the special tooth is very complex, and the wire winding of the coil winding comprises forward coil winding and reverse coil winding, which feature poor manufacturability, and comparatively low motor efficiency; a second one comprises: under a ratio between the number of teeth and the pole number of 3:2, magnetic tiles are designed to be eccentric, and are circumferentially distributed and attached to the surface of the motor. FIG. 2 illustrates counter-electromotive force of the coil winding, a waveform of the counter-electromotive force of the motor is like sine wave with large distortion. As being driven by the sine wave, the motor has large vibration and noises, which causes advantages of the sine wave motor not to be embodied, results in large eccentricity of the magnetic tile, and increases cost of the magnetic tile.

SUMMARY OF THE INVENTION

In view of the above-described problem, it is one objective of the invention to provide a permanent magnet rotor that features simple structure, good manufacturability, easy installation and production, enables a motor having a ratio between the number of teeth and the pole number of the permanent magnet of the rotor of 3:2 to generated good sine wave counter-electromotive force, adequately embodies advantages of sine wave drive, and reduces vibration and noise.

It is another objective of the invention to provide a motor that uses a special rotor to generate good sine wave counter-electromotive force under a ratio between the number of teeth and the pole number of 3:2, features simple structure, good manufacturability, easy installation and production, adequately embodies advantages of sine wave drive, reduces vibration and noise, and improves efficiency.

To achieve the above objectives, in accordance with one embodiment of the invention, provided is a permanent magnet rotor, comprising a rotor core, and multiple permanent magnets. The permanent magnets are disposed on the rotor core, every two or three of the permanent magnets lean on each other and form a group of permanent magnets, a gap is disposed between adjacent groups of permanent magnets, the groups of permanent magnets are circumferentially distributed, magnetic polarities of the permanent magnet are alternatively distributed in a N phase and a S phase, and difference in an electric angle between centers of polarities of adjacent permanent magnets in one group is between 150 degrees and 170 degrees.

In a class of this embodiment, difference in an electric angle between centers of polarities of adjacent permanent magnets in two adjacent groups is between 190 degrees to 210 degrees.

In a class of this embodiment, the number of the permanent magnets is 8 or 12.

In a class of this embodiment, the permanent magnet is disposed on side wall of the rotor.

In a class of this embodiment, the number of the circumferentially distributed groups is 4.

In accordance with one embodiment of the invention, provided is a motor, comprising a stator, comprising a stator core and a coil winding, and a rotor, comprising a rotor core and multiple permanent magnets. Multiple wire receiving grooves are disposed on the stator core, the permanent magnets are disposed on the rotor core, a ratio between the number of teeth of the wire receiving grooves and that of the permanent magnets is 3:2, every two or three of the permanent magnets lean on each other and form a group of permanent magnets, a gap is disposed between adjacent groups of permanent magnets, the groups of permanent magnets are circumferentially distributed, magnetic polarities of the permanent magnet are alternatively distributed in a N phase and a S phase, difference in an electric angle between centers of polarities of adjacent permanent magnets in one group is between 150 degrees and 170 degrees.

In a class of this embodiment, difference in an electric angle between centers of polarities of adjacent permanent magnets in two adjacent groups is between 190 degrees to 210 degrees.

In a class of this embodiment, the number of the permanent magnets is 8 or 12, and the number of teeth of the wire receiving groove is 12 or 18.

In a class of this embodiment, the permanent magnet is disposed on side wall of the rotor.

In a class of this embodiment, the number of the permanent magnets is 8, the number of teeth of the wire receiving groove is 12, and two permanent magnets lean on each other whereby forming a group.

In a class of this embodiment, the number of the permanent magnets is 12, the number of teeth of the wire receiving groove is 18, and three permanent magnets lean on each other whereby forming a group.

In a class of this embodiment, the number of the circumferentially distributed groups is 4.

Advantages of the invention comprise: 1) every two or three of the permanent magnets leaning on each other form a group of permanent magnets, a gap is disposed between adjacent groups of permanent magnets, the groups of permanent magnets are circumferentially distributed, magnetic polarities of the permanent magnet are alternatively distributed in a N phase and a S phase, difference in an electric angle between centers of polarities of adjacent permanent magnets in one group is between 150 degrees and 170 degrees, which feature simple structure, good manufacturability, and easy installation and production; 2) under a ratio between the number of teeth and that of the permanent magnets of the rotor of 3:2, the above-mentioned rotor simplifies a wire receiving technique of the motor, implements easy installation and production of the motor, enables the motor to generate good sine wave counter-electromotive force, embodies advantages of the sine wave drive, reduces vibration and noise, improves motor efficiency by at least 5% as indicated by experiments.

DETAILED DESCRIPTION OF THE EMBODIMENTS

Detailed description will be given below in conjunction with specific embodiments and accompanying drawings.

Example 1

Figure 1:
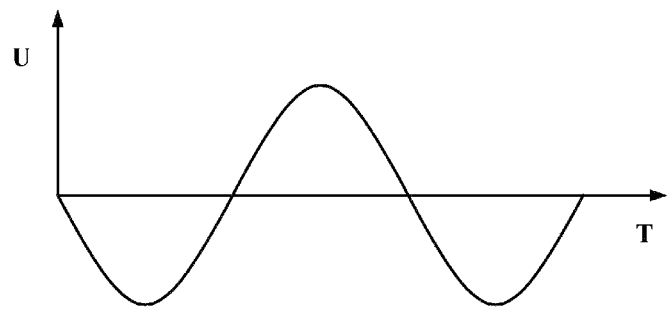
FIG. 1 is a waveform of counter-electromotive force of a motor using a combination of the special teeth and the pole number in the related art.
Figure 2:
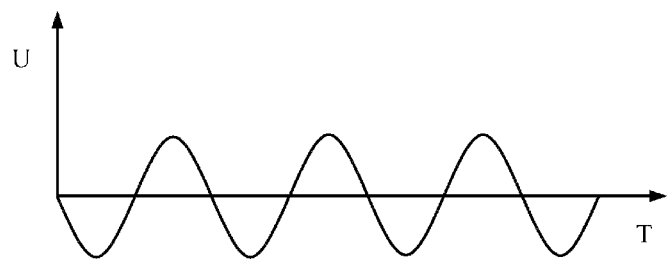
FIG. 2 is a waveform of counter-electromotive force of a motor using a rotor made of an eccentric tile in the related art.
Figure 3:
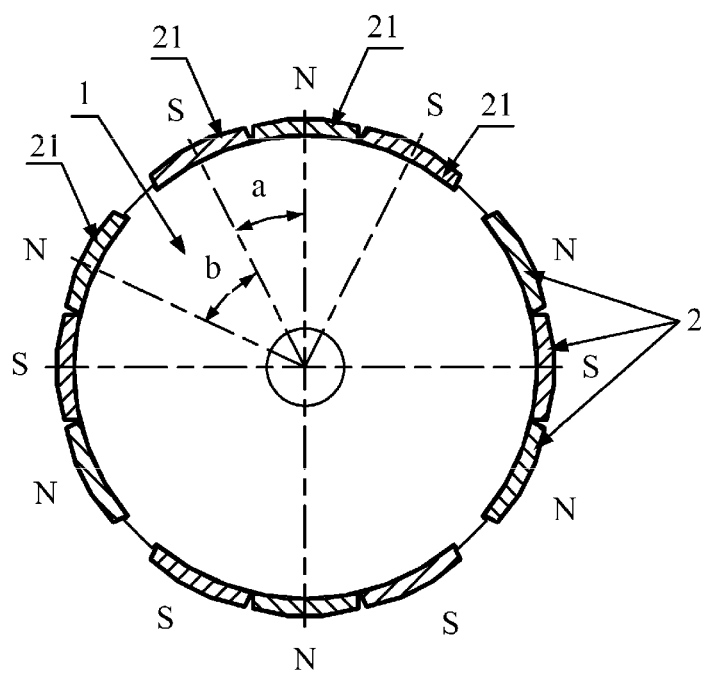
FIG. 3 is a cross sectional view of a motor of an embodiment of the invention.
Figure 4:
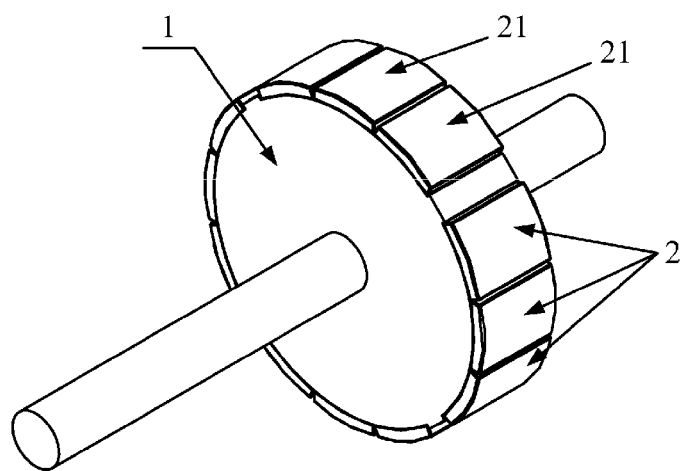
FIG. 4 is a schematic view of a motor of an embodiment of the invention.
Figure 5:
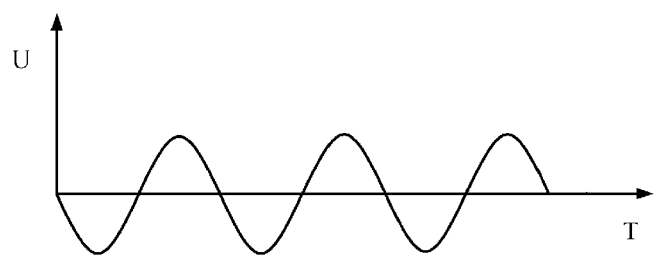
FIG. 5 illustrates a waveform for measuring sine wave counter-electromotive force of the invention.

As shown in FIGS. 3, 4 and 5, a motor of the invention comprises a stator and a rotor. The stator comprises a stator core and a coil winding, and multiple wire receiving grooves are disposed on the stator core. The rotor comprises a rotor core 1 and multiple permanent magnets 21, and the permanent magnets 21 are disposed on side wall of the rotor core 1. A ratio between the number of teeth of the wire receiving grooves and that of the permanent magnets 21 is 3:2. Every three of the permanent magnets 21 lean on each other and form a group, a gap is disposed between adjacent groups 2 of permanent magnets, the groups 2 of permanent magnets are circumferentially distributed, magnetic polarities of the permanent magnet 21 are alternatively distributed in a N phase and a S phase, difference in an electric angle A between centers of polarities of adjacent permanent magnets 21 in one group 2 is between 150 degrees and 170 degrees. Difference in an electric angle B between centers of polarities of adjacent permanent magnets 21 in two adjacent groups 2 is between 190 degrees to 210 degrees. The number of the teeth of the wire receiving groove is 18, and the number of the permanent magnets is 12. The permanent magnet is disposed on side wall of the rotor. Four groups 2 of permanent magnets are circumferentially distributed. As shown in FIG. 5, the motor using the rotor of the invention is capable of generating a good waveform of sine wine counter-electromotive force.

As shown in FIG. 3, according to an equation of calculating an angle. Difference in a mechanical angle a between centers of polarities of adjacent permanent magnets 21 in one group 2 is equal to an electric angle A/the number of pole pairs P. In this embodiment, the number of pole pairs P of the permanent magnet 21 is 6, and the electric angle A is between 150 degrees and 170 degrees. Then difference in a mechanical angle a between centers of polarities of adjacent permanent magnets 21 in one group 2 is between 25 degrees and 28.33 degrees. Similarly, difference in a mechanical angle b between centers of polarities of adjacent permanent magnets 21 in two adjacent groups 2 is equal to an electric angle B/the number of pole pairs. In this embodiment, the number of pole pairs P of the permanent magnet 21 is 6, and the electric angle B is between 190 degrees and 210 degrees. Then the mechanical angle b is between 31.66 degrees and 35 degrees.

Principle of the invention that is capable of generating good sine wave counter-electromotive force is: for a three-phase motor, the number of teeth of the wire receiving groove is 18, and the number of the permanent magnets is 12, For a conventional rotor, all the permanent magnets are circumferentially distributed, each phase of same phases comprises six teeth uniformly distributed in a circle, and phases of counter-electromotive force on all teeth of every phase are the same, and waveforms of six teeth in-phase are stacked. In this scenario, a waveform of a single-phase counter-electromotive force of the rotor is determined by eccentricity of the magnetic tile of the rotor. A counter-electromotive force waveform of the motor is like a sine wave with large distortion. As being driven by sine wave, large vibration and noise occur on the motor. If the rotor of the invention is used, every three permanent magnets 21 leaning on each other form a group, a gap is disposed between adjacent groups 2 of permanent magnets, and the groups 2 of permanent magnets are circumferentially distributed. Shifting of the permanent magnet by a certain electric angle causes counter-electromotive force on the single-phase stator winding with six teeth on the stator to have different phases, and to be staggered with each other by a certain angle, which in theory is more effective for implementing sine wave by stacking waveforms of counter-electromotive force of all teeth staggered with each other by a certain angle.

Example 2

A rotor of this embodiment comprises a rotor core 1 and multiple permanent magnets 21. The permanent magnets 21 are disposed on side wall of the rotor core 1. A ratio between the number of wire receiving grooves and that of the permanent magnets 21 is 3:2. Every two of the permanent magnets 21 lean on each other and form a group, a gap is disposed between adjacent groups 2 of permanent magnets, the groups 2 of permanent magnets are circumferentially distributed, magnetic polarities of the permanent magnet 21 are alternatively distributed in a N phase and a S phase, difference in an electric angle A between centers of polarities of adjacent permanent magnets 21 in one group 2 is between 150 degrees and 170 degrees. Difference in an electric angle B between centers of polarities of adjacent permanent magnets 21 in two adjacent groups 2 is between 190 degrees to 210 degrees. The number of the teeth of the wire receiving groove is 12, and the number of the permanent magnets is 8. The permanent magnet is disposed on side wall of the rotor. Four groups 2 of permanent magnets are circumferentially distributed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet rotor, comprising:
a rotor core; and
twelve permanent magnets;
wherein:
said twelve permanent magnets are disposed on said rotor core and combined form six pole pairs;
every three of said permanent magnets lean on one another and form a group of permanent magnets;
a gap is disposed between adjacent groups of permanent magnets;
said groups of permanent magnets are circumferentially distributed;
magnetic polarities of said permanent magnets comprise north polarities and south polarities which are alternately distributed;
polarity centers of adjacent permanent magnets belonging to one group are separated from each other by a mechanical angle of between 25 degrees and 28.33 degrees; and
polarity centers of adjacent permanent magnets belonging to two adjacent groups are separated from each other by a mechanical angle of between 31.66 degrees and 35 degrees.

* * * * *